(12) United States Patent
Burba

(10) Patent No.: US 8,809,229 B2
(45) Date of Patent: Aug. 19, 2014

(54) FILTER SUBSTRATE COMPOSITION

(71) Applicant: John L. Burba, Parker, CO (US)

(72) Inventor: John L. Burba, Parker, CO (US)

(73) Assignee: Molycorp Minerals, LLC, Greenwood Village, CO (US)

( * ) Notice: Subject to any disclaimer, the term of this patent is extended or adjusted under 35 U.S.C. 154(b) by 0 days.

(21) Appl. No.: 14/021,952

(22) Filed: Sep. 9, 2013

(65) Prior Publication Data

US 2014/0007773 A1   Jan. 9, 2014

Related U.S. Application Data

(63) Continuation of application No. 13/434,214, filed on Mar. 29, 2012, now Pat. No. 8,557,730, which is a continuation of application No. 11/932,702, filed on Oct. 31, 2007, now Pat. No. 8,349,764.

(51) Int. Cl.
*B01J 20/26* (2006.01)

(52) U.S. Cl.
USPC .......................................... 502/402; 502/518

(58) Field of Classification Search
USPC ......... 210/181, 186, 203, 209, 266, 282, 284, 210/290, 911; 502/402, 400, 401, 518, 526
See application file for complete search history.

(56) References Cited

U.S. PATENT DOCUMENTS

| 6,863,825 B2 * | 3/2005 | Witham et al. | 210/665 |
| 7,048,853 B2 * | 5/2006 | Witham et al. | 210/205 |
| 8,066,874 B2 * | 11/2011 | Burba et al. | 210/181 |

* cited by examiner

*Primary Examiner* — Edward Johnson
(74) *Attorney, Agent, or Firm* — Sheridan Ross P.C.

(57) ABSTRACT

An aggregate composition and process for making the aggregate composition. The aggregate composition includes an insoluble rare earth-containing compound and a polymer binder. The insoluble rare earth-containing compound can include one or more of cerium, lanthanum, or praseodymium. A suitable insoluble cerium-containing compound can be derived from cerium carbonate or a cerium salt. In a specific embodiment, the aggregate composition consists essentially of one or more cerium oxides, the polymer binder and optionally a flow aid. A process for making the composition includes mixing the insoluble rare earth-containing compound with a polymer binder to form a mixture, and subjecting the mixture to mechanical, chemical and/or thermal treatment to adhere the rare earth compound to the polymer binder. The aggregate composition can be used in a variety of fluid treatment applications to remove one or more chemical and biological contaminants in a fluid.

19 Claims, No Drawings

FILTER SUBSTRATE COMPOSITION

CROSS-REFERENCE TO RELATED APPLICATIONS

This application is a continuation of U.S. patent application Ser. No. 13/434,214 having a filing date of Mar. 29, 2012 which is continuation of U.S. patent application Ser. No. 11/932,702 with a filing date of Oct. 31, 2007 and now U.S. Pat. No. 8,349,702, both entitled "Composition and Process for Making the Composition", each of which is incorporated herein by this reference in its entirety.

FIELD OF THE INVENTION

The invention relates generally to the field of fluid treatment, and primarily to compositions for treating solutions and gases. In its more particular aspects, the invention relates to aggregate compositions suitable for use in treating aqueous solutions and gases that contain one or more chemical and biological contaminants, and processes for making such aggregate compositions.

BACKGROUND OF THE INVENTION

The purification and filtration of water and other aqueous solutions is necessary for many applications such as the provision of safe potable drinking water, the treatment of feeds, process streams and by-products associated with various industrial processes, and the treatment and handling of municipal waste water. Known methods for purifying aqueous solutions include reverse osmosis, distillation, ion-exchange, chemical adsorption, coagulation, flocculation, and filtering or retention. Many of these purification practices can be costly, energy inefficient and require significant technical know-how and sophistication to implement on both large and small scales. As a result, many advanced fluid purification technologies have had limited application beyond municipal or industrial applications.

Biological contaminants such as bacteria and fungi can be removed from aqueous solutions through ultrafiltration, but viruses are generally too small for filtration to be an effective means of purification. Because filtration is only somewhat effective, treatment with chemical additives tends to be the method of choice to address the presence of such contaminants. Examples of chemical additives include strong oxidizing agents such as chlorine, hydrogen peroxide, ozone or quaternary amine salts, flocculating agents, and precipitation agents. However, the use of chemical additive(s) requires careful administration and monitoring of the treated solutions as well special handling, transport, and storage, rendering them more costly and less desirable for many applications. As a result, simplified means for removing biological contaminants from aqueous solutions is desired.

In addition, with the recent rise in terrorism, governments around the world have become increasingly concerned about the effects of chemical warfare agents, biological agents, industrial chemicals and other toxic materials. Because nations stockpile such materials for both industrial uses and for use as warfare agents, such contaminants represent a hazard to armed forces and civilian populations due to potential exposure through inhalation, absorption, and/or ingestion. As a result, the contamination of ground water and other sources of potable water with chemical and biological contaminants is a primary concern for the military and for municipal governments and utility districts.

Commonly known chemical warfare agents include organosulfur-based compounds such as 2,2'-Dichlorodiethyl sulfide (HD, mustard, mustard gas, S mustard or sulfur mustard), which are known as "blister" or "blistering" agents and can be lethal in high doses. Other chemical warfare agents include organophosphorus-based ("OP") compounds, such as O-ethyl S-(2-diisopropylamino) ethyl methylphosphonothiolate (VX), 2-Propyl methylphosphonofluoridate (GB or Sarin), and 3,3'-Dimethyl-2-butyl methylphosphonofluoridate (GD or Soman), which are commonly referred to as "nerve" agents because they attack the central nervous system and can cause paralysis and potentially death in a short period of time. Other chemical contaminants include certain industrial chemicals, insecticides and pesticides such as parathion, paraoxon and malathion, which can also have harmful effects.

Methods and materials for decontaminating surfaces exposed to chemical warfare agents are known in the art. Yang et al., "Decontamination of Chemical Warfare Agents", Chem. Rev. Vol. 92, pp 1729-1743 (1992). These methods, and materials tend to function by chemically reacting with and/or adsorbing the chemical warfare agent, but are focused on decontaminating vehicles, equipment, personnel and other surfaces that have been exposed to the agent. Because such methods and materials are not suitable or sufficiently effective at treating chemical warfare agents in solution there remains a need for simplified means for removing and/or detoxifying a broad spectrum of chemical contaminants from aqueous solutions, including, but not limited to, nerve agents, blister agents, pesticides, insecticides and other toxic chemical agents.

Moreover, exposure to chemical and biological contaminants through inhalation is also a concern that has not been adequately addressed. Basic methods that are used to control air quality include filtration, absorption on solid sorbents, electrostatic precipitation, chemical conversion, and treatment with various forms of radiation including heat, ultraviolet light and microwave. Gas filtration methods tend to be limited by the pore size of the filters, and are generally not capable of removing many biological and chemical contaminants. The use of ultra small pore sizes tend to clog due to particulates on the filter producing excessive pressure drop across the filter that is unacceptable for many applications. Electrostatic precipitation operates by imposing a charge on particles and then removing them from a gas stream onto an oppositely charged surface such as on a collection plate. This technique is not well suited for high velocity gas streams, for fluids containing volatile chemical contaminants or for contaminants that are otherwise difficult to charge. Chemical reactions tend to be effective on only small volumes of gas and can require additional processing or handling of the gas to remove undesirable and potentially harmful reagents and byproducts that remain. Heating, although effective for removing many types of biological and chemical contaminants from gases, tends to be ineffective on higher velocity gas streams. Ultraviolet light can be effective but is difficult to implement on larger gas volumes as the light tends to be absorbed by only those contaminants in the portion of the gas stream immediately adjacent the light source.

Adsorption of gases on a sorbent can be effective particularly where the sorbent is specifically matched to the contaminant to be removed from the gas. However, where the specific nature of the contaminant is not known or where the gas stream contains a number of diverse contaminants the use of known sorbents may not adequately purify the gas. As a result, there remains a need for a composition that is capable of removing, deactivating and/or detoxifying a diverse set of biological and chemical contaminants such as bacteria, viruses, nerve agents, blister agents, pesticides, insecticides and other toxic chemical agents that may be present in a variety of fluids, including both aqueous solutions and gases.

SUMMARY OF THE INVENTION

In one embodiment, the invention provides an aggregate composition for treating a fluid containing one or more contaminants. The aggregate composition includes an insoluble rare earth-containing compound and a polymer binder.

The polymer binder can be less than about 15% by weight of the composition, in some cases less than about 10% by weight, and in still other cases less than about 8% by weight of the composition. The polymer binder can include one or more polymers selected from the group consisting of thermosetting polymers, thermoplastic polymers, elastomeric polymers, cellulosic polymers and glasses. Where the polymer binder comprises an ethylene-vinyl copolymer; the insoluble rare earth-containing compound consists essentially of an anhydrous insoluble rare earth-containing compound.

The insoluble rare earth-containing compound can include any insoluble rare earth compound but can specifically include one or more of cerium, lanthanum, or praseodymium. In some embodiments, the insoluble rare earth-containing compound can include a cerium-containing compound derived from thermal decomposition of a cerium carbonate or the decomposition of a cerium oxalate. In other embodiments, the insoluble rare earth-containing compound can include a cerium-containing compound derived from precipitation of a cerium salt. In other embodiments, the insoluble rare earth-containing compound comprises a cerium oxide. In a more specific embodiment, the aggregate composition consists essentially of one or more cerium oxides, the polymer binder, and optionally, a flow aid. The insoluble rare earth-containing compound can include particulates adhered to an outer surface of the polymer binder.

The aggregate composition can comprise aggregated particulates having a mean surface area of at least about $1\ m^2/g$, in some cases at least about $5\ m^2/g$, and in still other cases, at least about $25\ m^2/g$. The aggregate composition can comprise aggregated particulates having a mean aggregate size of at least about $1\ \mu m$. The aggregate composition has an adsorption capacity for removing arsenic from an aqueous solution of at least about 50 mg/g of the aggregate composition. In some cases, the adsorption capacity of the composition for removing arsenic from an aqueous solution is at least about 60 mg/g of the aggregate composition, and in other cases, at least about 70 mg/g.

In another aspect of the invention, a process for making an aggregate composition for treating a fluid containing one or more contaminants is provided. The process includes an initial step of mixing an insoluble rare earth-containing compound with a polymer binder to form a mixture.

The mixture is subjected to one or more of a mechanical, chemical and thermal treatment to adhere the insoluble rare earth-containing compound to the polymer binder. Mechanical treatments can include compacting, compressing, pressing, mixing, extruding and applying vibration or waves to the mixture. Chemical treatments can include one or more of chemical conversion and use of an adhesive. Thermal treatments can include heating the mixture to an elevated temperature, and allowing the mixture to cool to form an aggregate composition. In some embodiments, the elevated temperature is a temperature below the melting point of the polymer binder at which the polymer binder is malleable or tacky and the insoluble rare earth-containing compound adheres to the polymer binder. In an embodiment where the insoluble rare earth-containing compound comprises particulates, the particulates can adhere to the outer surface of the polymer binder.

The insoluble rare earth-containing compound can comprise particulates that adhere to an outer surface of the polymer binder. Optionally, the process can include compressing a heated mixture of insoluble rare earth-containing compound and polymer binder.

An optional step can include reducing the size of the aggregate composition. Size reduction can be achieved by one or more of cutting, crushing, milling, and sieving the aggregate composition.

The polymer binder can be less than about 15% by weight of the composition, in some cases less than about 10% by weight, and in still other cases less than about 8% by weight of the composition. The polymer binder can include one or more polymers selected from the group consisting of thermosetting polymers, thermoplastic polymers, elastomeric polymers, cellulosic polymers and glasses. Where the polymer binder comprises an ethylene-vinyl copolymer, the insoluble rare earth-containing compound consists essentially of an anhydrous insoluble rare earth-containing compound.

The polymer binder can be a solid. In some embodiments, the polymer binder comprises one or more of fibers, particulates, aggregates of fibers and or particulates, and mixtures of the same. The insoluble rare earth-containing compound can include particulates having a mean particle size of greater than about 1 nm. The insoluble rare earth-containing compound can include any insoluble rare earth compound but can specifically include one or more of cerium, lanthanum, or praseodymium. In some embodiments, the insoluble rare earth-containing compound can include a cerium-containing compound derived from thermal decomposition of a cerium carbonate. In other embodiments, the insoluble rare earth-containing compound can include a cerium-containing compound derived from precipitation of a cerium salt. In other embodiments, the insoluble rare earth-containing compound comprises a cerium oxide. In a more specific embodiment, the aggregate composition consists essentially of one or more cerium oxides, the polymer binder, and optionally, a flow aid.

DETAILED DESCRIPTION OF THE PREFERRED EMBODIMENTS

Illustrative embodiments of the invention are described below. In the interest of clarity, not all features of an actual embodiment are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover it will be appreciated that such a development effort might be complex and time-consuming, but would nevertheless be a routine undertaking for those of ordinary skill in the art having the benefit of this disclosure.

It will be understood that an aggregate composition as described herein can be used to remove, deactivate and/or detoxify one or more chemical and biological contaminants in an aqueous solution or gas. Examples of solutions that can be treated with the compositions described herein include solutions in potable water systems, in waste water treatment systems, and in feed, process or waste streams of various industrial processes, among others. Moreover, there is a need to treat gases containing such contaminants in open environments such as on the battlefield, in enclosed spaces such as within buildings or similar structures, within vehicles such as airplanes, space craft, ships or military vehicles, and wherever such contaminants may be found. The described compositions can be used to remove chemical and biological contaminants from aqueous solutions and gases having diverse volume and flow rate characteristics and can be applied in a variety of fixed, mobile and portable applications. While portions of the disclosure herein describe the removal of contaminants from water, such references are illustrative and are not to be construed as limiting.

As used herein, "one or more of" and "at least one of" when used to preface several elements or classes of elements such as X, Y and Z or $X_1$-$X_n$, $Y_1$-$Y_n$ and $Z_1$-$Z_n$, is intended to, refer to a single element selected, from X or Y or Z, a combination of elements selected from the same class (such as $X_1$ and $X_2$), as well as a combination of elements selected from two or more classes (such as $Y_1$ and $Z_n$).

The terminology "remove" or "removing" includes the sorption, precipitation, conversion, and killing of pathogenic and other microorganisms, such as bacteria, viruses, fungi and protozoa and of chemical contaminants that may be present in the solution or gas. The terms "deactivate" or "deactivation", "de-toxify" or "de-toxification" and "neutralize" include removing a biological or chemical contaminant from a fluid or rendering it non-pathogenic or benign to humans or other animals such as for example by killing the microorganism or converting the chemical agent into a non-toxic form or species.

The terms "biological contaminant", "microbe", "microorganism", and the like include bacteria, fungi, protozoa, viruses, algae and other biological entities and pathogenic species that can be found in aqueous solutions. Specific non-limiting examples of biological contaminants can include bacteria such as *Escherichia coli, Streptococcus faecalis, Shigella* spp, *Leptospira, Legimella pneumophila, Yersinia enterocolitica, Staphylococcus aureus, Pseudomonas aeruginosa, Klebsiella terrigena, Bacillus anthracis, Vibrio cholerae* and *Salmonella typhi*, viruses such as hepatitis A, noroviruses, rotaviruses, and enteroviruses, protozoa such as *Entamoeba histolytica, Giardia, Cryptosporidium parvum* and others. Biological contaminants can also include various species such as fungi or algae that are generally non-pathogenic but which are advantageously removed. How such biological contaminants came to be present in the solution or gas, either through natural occurrence or through intentional or unintentional contamination, is non-limiting of the invention.

The term "chemical contaminant" or "chemical agent" includes known chemical warfare agents and industrial chemicals and materials such as pesticides, insecticides and fertilizers. In some embodiments, the chemical contaminant can include one or more of an organosulfur agent, an organophosphorous agent or a mixture thereof. Specific non-limiting examples of such agents include o-alkyl phosphonofluoridates, such as sarin and soman, o-alkyl phosphoramidocyanidates, such as tabun, o-alkyl, s-2-dialkyl aminoethyl alkylphosphonothiolates and corresponding alkylated or protonated salts, such as VX, mustard compounds, including 2-chloroethylchloromethylsulfide, bis(2-chloroethyl)sulfide, bis(2-chloroethylthio)methane, 1,2-bis(2-chloroethylthio)ethane, 1,3-bis(2-chloroethylthio)-n-propane, 1,4-bis(2-chloroethylthio)-n-butane, 1,5-bis(2-chloroethylthio)-n-pentane, bis(2-chloroethylthiomethyl) ether, and bis(2-chloroethylthioethyl)ether, Lewisites, including 2-chlorovinyldichloroarsine, bis(2-chlorovinyl) chloroarsine, tris(2-chlorovinyl)arsine, bis(2-chloroethyl) ethylamine, and bis(2-chloroethyl)methylamine, saxitoxin, ricin, alkyl phosphonyldifluoride, alkyl phosphonites, chlorosarin, chlorosoman, amiton, 1,1,3,3,3,-pentafluoro-2-(trifluoromethyl)-1-propene, 3-quinuclidinyl benzilate, methylphosphonyl dichloride, dimethyl methylphosphonate, dialkyl phosphoramidic dihalides, alkyl phosphoramidates, diphenyl hydroxyacetic acid, quinuclidin-3-ol, dialkyl aminoethyl-2-chlorides, dialkyl aminoethane-2-ols, dialkyl aminoethane-2-thiols, thiodiglycols, pinacolyl alcohols, phosgene, cyanogen chloride, hydrogen cyanide, chloropicrin, phosphorous oxychloride, phosphorous trichloride, phosphorus pentachloride, alkyl phosphorous oxychloride, alkyl phosphites, phosphorous trichloride, phosphorus pentachloride, alkyl phosphites, sulfur monochloride, sulfur dichloride, and thionyl chloride.

Non-limiting examples of industrial chemical and materials that may be effectively treated with the compositions described herein include materials that have anionic functional groups such as phosphates, sulfates and nitrates, and electro-negative functional groups, such as chlorides, fluorides, bromides, ethers and carbonyls. Specific non-limiting examples can include acetaldehyde, acetone, acrolein, acrylamide, acrylic acid, acrylonitrile, aldrin/dieldrin, ammonia, aniline, arsenic, atrazine, barium, benzidine, 2,3-benzofuran, beryllium, 1,1'-biphenyl, bis(2-chloroethyl)ether, bis(chloromethyl)ether, bromodichloromethane, bromoform, bromomethane, 1,3-butadiene, 1-butanol, 2-butanone, 2-butoxyethanol, butraldehyde, carbon disulfide, carbon tetrachloride, carbonyl sulfide, chlordane, chlorodecone and mirex, chlorfenvinphos, chlorinated dibenzo-p-dioxins (CDDs), chlorine, chlorobenzene, chlorodibenzofurans (CDFs), chloroethane, chloroform, chloromethane, chlorophenols, chlorpyrifos, cobalt, copper, creosote, cresols, cyanide, cyclohexane, DDT, DDE, DDD, DEHP, di(2-ethylhexyl)phthalate, diazinon, dibromochloropropane, 1,2-dibromoethane, 1,4-dichlorobenzene, 3,3'-dichlorobenzidine, 1,1-dichloroethane, 1,2-dichloroethane, 1,1-dichloroethene, 1,2-dichloroethene, 1,2-dichloropropane, 1,3-dichloropropene, dichlorvos, diethyl phthalate, diisopropyl methylphosphonate, di-n-butylphthalate, dimethoate, 1,3-dinitrobenzene, dinitrocresols, dinitrophenols, 2,4- and 2,6-dinitrotoluene, 1,2-diphenylhydrazine, di-n-octylphthalate (DNOP), 1,4-dioxane, dioxins, disulfoton, endosulfan, endrin, ethion, ethylbenzene, ethylene oxide, ethylene glycol, ethylparathion, fenthions, fluorides, formaldehyde, freon 113, heptachlor and heptachlor epoxide, hexachlorobenzene, hexachlorobutadiene, hexachlorocyclohexane, hexachlorocyclopentadiene, hexachloroethane, hexamethylene diisocyanate, hexane, 2-hexanone, HMX (octogen), hydraulic fluids, hydrazines, hydrogen sulfide, iodine, isophorone, malathion, MBOCA, methamidophos, methanol, methoxychlor, 2-methoxyethanol, methyl ethyl ketone, methyl isobutyl ketone, methyl mercaptan, methylparathion, methyl t-butyl ether, methylchloroform, methylene chloride, methylenedianiline, methyl methacrylate, methyl-tert-butyl ether, mirex and chlordecone, monocrotophos, N-nitrosodimethylamine, N-nitrosodiphenylamine, N-nitrosodi-n-propylamine, naphthalene, nitrobenzene, nitrophenols, perchloroethylene, pentachlorophenol, phenol, phosphamidon, phosphorus, polybrominated biphenyls (PBBs), polychlorinated biphenyls (PCBs), polycyclic aromatic hydrocarbons (PAHs), propylene glycol, phthalic anhydride, pyrethrins and pyrethroids, pyridine, RDX (cyclonite), selenium, styrene, sulfur dioxide, sulfur trioxide, sulfuric acid, 1,1,2,2-tetrachloroethane, tetrachloroethylene, tetryl, thallium, tetrachloride, trichlorobenzene, 1,1,1-trichloroethane, 1,1,2-trichloroethane, trichloroethylene (TCE), 1,2,3-trichloropropane, 1,2,4-trimethylbenzene, 1,3,5-trinitrobenzene, 2,4,6-trinitrotoluene (TNT), vinyl acetate, and vinyl chloride.

In one embodiment of the invention, an aggregate composition is provided for treating a fluid containing one or more chemical and biological contaminants. The aggregate composition comprises an insoluble rare earth-containing compound and a polymer binder.

As used herein, "insoluble" is intended to refer to materials that are insoluble in water, or at most, are sparingly soluble in water under standard conditions of temperature and pressure.

The composition can comprise less than or more than 10.01% by weight of the insoluble rare earth-containing compound. The insoluble rare earth-containing compound can constitute more than about 11%, more than about 12% or more than about 15% by weight of the aggregate composition. In some cases, a higher concentration of rare earth-containing compounds may be desired. Depending on the application and the nature of other components in the composition, the composition can be at least about 20%, in other cases at least about 50%, in still others at least about 75%, and in yet still others more than 95%, by weight of an insoluble rare earth-containing compound.

The insoluble rare earth-containing compound can include one or more of the rear earths including lanthanum, cerium, praseodymium, neodymium, promethium, samarium, europium, gadolinium, terbium, dysprosium, holmium erbium, thulium, ytterbium and lutetium. In some embodiments, the insoluble rare-earth containing compound can comprise one or more of cerium, lanthanum, or praseodymium. Insoluble rare earth-containing compounds are available commercially and may be obtained from any source or through any process known to those skilled in the art. The composition need not include a single rare earth-containing compound but can include two or more insoluble rare earth-containing compounds. Such compounds can contain the same or different rare earth elements and can contain mixed valence or oxidation states. By way of example, when the insoluble rare earth-containing compound comprises a cerium oxide, the aggregate composition can comprise one or more cerium oxides such as $CeO_2$ (IV) and $Ce_2O_3$ (III).

In an embodiment where the insoluble rare earth-containing compound comprises a cerium-containing compound, the cerium-containing compound can be derived from precipitation of a cerium salt. In another embodiment, an insoluble cerium-containing compound can be derived from a cerium carbonate or a cerium oxalate. More specifically, a high surface area insoluble cerium-containing compound can be prepared by thermally decomposing a cerium carbonate or oxalate at a temperature between about 100° C. and about 350° C. in a furnace in the presence of air. The temperature and pressure conditions may be altered depending on the composition of the cerium containing starting material and the desired physical properties of the insoluble rare earth-containing compound. The reaction may be summarized as:

$$Ce_2(CO_3)_3 + \tfrac{1}{2}O_2 \rightarrow 2CeO_2 + 3CO_2$$

The product may be acid treated and washed to remove remaining carbonate. Thermal decomposition processes for producing cerium oxides having various features are described in U.S. Pat. No. 5,897,675 (specific surface areas), U.S. Pat. No. 5,994,260 (pores with uniform lamellar structure), U.S. Pat. No. 6,706,082 (specific particle size distribution), and U.S. Pat. No. 6,887,566 (spherical particles), and such descriptions are incorporated herein by reference. Cerium carbonate and materials containing cerium carbonate are commercially available and may be obtained from any source known to those skilled in the art.

In embodiments where the insoluble rare earth-containing compound comprises a cerium oxide, the insoluble rare earth-containing compound can include a cerium oxide such as $CeO_2$. In a particular embodiment, the aggregate composition can consists essentially of one or more cerium oxides, the polymer binder, and optionally, a flow aid.

The insoluble rare earth-containing compound can be present in the aggregate composition in the form of one or more of a granule, crystal, crystallite, particle or other particulate, referred to generally herein as a "particulate." The particulates of the insoluble rare earth-containing compounds can have a mean particle size of at least about 0.5 nm ranging up to about 1 or more. Specifically, such particulates can have a mean particle size of at least about 0.5 nm, more than about 1 nm, more particularly at least about 5 nm, and still more particularly at least about 10 nm. In other embodiments, the particulates can have mean particle sizes of at least about 100 nm, specifically at least about 250 nm, more specifically at least about 500 nm, and still more specifically at least about 1 µm.

To promote interaction of the insoluble rare earth-containing compound with a contaminant in a solution or gas, the aggregate composition can comprise aggregated particulates of the insoluble rare earth-containing compound having a mean surface area of at least about 1 $m^2/g$. Depending upon the application, higher surface areas may be desired. Specifically, the particulates can have a surface area of at least about 5 $m^2/g$, in other cases more than about 10 $m^2/g$, and in still other cases more than about 25 $m^2/g$. Where higher surface areas are desired, the particulates can have a surface area of more than about 70 $m^2/g$, in other cases more than about 85 $m^2/g$, in still other cases more than 115 $m^2/g$, and in yet other cases more than about 160 $m^2/g$. In addition, it is envisioned that particulates with higher surface areas will be effective. One skilled in the art will recognize that in applications where the solution or gas flows through the composition, the surface area of the composition will impact the fluid dynamics of the fluid with the aggregate composition. As a result, one may need to balance benefits that are derived from increased surface areas with disadvantages such as pressure drop that may occur.

A polymer binder is included in the composition for forming an aggregate having desired size, structure, density, porosity and fluid properties. In some embodiments, the polymer binder can comprise one or more of fibers, particulates, aggregates of fibers and or particulates, and mixtures of the same. A suitable polymer binder can include any polymeric material that will bind and/or support the insoluble rare earth-containing compound under conditions of use. Suitable polymeric binders will include both naturally occurring and synthetic polymers, as well as synthetic modifications of such polymers. One skilled in the art will recognize that the selection of the polymer binder material will depend on such factors as the composition components, the properties of such components, their binding characteristics, the characteristics of the final composition and the intended method of use.

In general, polymers melting between about 50° C. and about 500° C., more particularly, between about 75° C. and about 350° C., even more particularly between about 80° C. and about 200° C., are suitable for use in aggregating the components of the composition. Non-limiting examples can include polyolefins that soften or melt in the range from about 85° C. to about 180° C., polyamides that soften or melt in the range from about 200° C. to about 300° C., and fluorinated polymers that soften or melt in the range from about 300° C. to about 400° C. The melting point of the polymer binder will preferably not exceed the sintering temperature of the selected insoluble rare earth-containing compound.

Such polymer materials will generally be included in the aggregate composition in amounts ranging from about 0 wt % to about 90 wt %, based upon the total weight of the composition. In some embodiments, the polymer binder will be present in an amount less than about 15% by weight of the composition. More specifically, the polymer binder may be less than about 10%, and in other embodiments, less than about 8% by weight of the composition.

Depending upon the desired properties of the composition, polymer binders can include one or more polymers generally categorized as thermosetting, thermoplastic, elastomer, or a combination thereof as well as cellulosic polymers and glasses. Suitable thermosetting polymers include, but are not limited to, polyurethanes, silicones, fluorosilicones, phenolic resins, melamine resins, melamine formaldehyde, and urea formaldehyde. Suitable thermoplastics can include, but are not limited to, nylons and other polyamides, polyethylenes, including LDPE, LLDPE, HDPE, and polyethylene copolymers with other polyolefins, polyvinylchlorides (both plasticized and unplasticized), fluorocarbon resins, such as polytetrafluoroethylene, polystyrenes, polypropylenes, cellulosic resins such as cellulose acetate butyrates, acrylic resins, such as polyacrylates and polymethylmethacrylates, thermoplastic blends or grafts such as acrylonitrile-butadiene-styrenes or acrylonitrile-styrenes, polycarbonates, polyvinylacetates, ethylene vinyl acetates, polyvinyl alcohols, polyoxymethylene, polyformaldehyde, polyacetals, polyesters, such as polyethylene terephthalate, polyether ether ketone, and phenolformaldehyde resins, such as resols and novolacs. Suitable elasomers can include, but are not limited to, natural and/or synthetic rubbers, like styrene-butadiene rubbers, neoprenes, nitrile rubber, butyl rubber, silicones, polyurethanes, alkylated chlorosulfonated polyethylene, polyolefins, chlorosulfonated polyethylenes, perfluoroelastomers, polychloroprene (neoprene), ethylene-propylene-diene terpolymers, chlorinated polyethylene, fluoroelastomers, and ZALAK™ (Dupont-Dow elastomer). In a specific embodiment where the polymer binder comprises an ethylene vinyl copolymer, the insoluble rare earth-containing compound consists essentially of an anhydrous rare earth-containing compound. Those of skill in the art will realize that some of the thermoplastics listed above can also be thermosets depending upon the degree of cross-linking, and that some of each may be elastomers depending upon their mechanical properties. The categorization used above is for ease of understanding and should not be regarded as limiting or controlling.

Cellulosic polymers can include naturally occurring cellulose such as cotton, paper and wood and chemical modifications of cellulose. In a specific embodiment, the insoluble rare earth-containing compound can be mixed with paper fibers or incorporated directly into paper pulp for forming a paperbased filter comprising the insoluble rare earth-containing compound.

Polymer binders can also include glass materials such as glass fibers, beads and mats. Glass solids may be mixed with particulates of an insoluble rare earth-containing compound and heated until the solids begin to soften or become tacky so that the insoluble rare earth-containing compound adheres to the glass. Similarly, extruded or spun glass fibers may be coated with particles of the insoluble rare earth-containing compound while the glass is in a molten or partially molten state or with the use of adhesives. Alternatively, the glass composition may be doped with the insoluble rare earth-containing compound during manufacture. Techniques for depositing or adhering insoluble rare earth-containing compounds to a substrate material are described in U.S. Pat. No. 7,252,694 and other references concerning glass polishing. For example, electro-deposition techniques and the use of metal adhesives are described in U.S. Pat. No. 6,319,108 as being useful in the glass polishing art. The descriptions of such techniques are incorporated herein by reference.

In some applications, water-soluble glasses such as are described in U.S. Pat. Nos. 5,330,770, 6,143,318 and 6,881,766, may be an appropriate polymer binder. The descriptions of such glasses in the noted references are incorporated herein by reference. In other applications, materials that swell through fluid absorption including but not limited to polymers such as synthetically produced polyacrylic acids, and polyacrylamides and naturally-occurring organic polymers such as cellulose derivatives may also be used. Biodegradable polymers such as polyethylene glycols, polylactic acids, polyvinylalcohols, co-polylactideglycolides, and the like may also be used as the polymer binder.

Where it is desirable to regenerate the composition through sterilization, the selected polymer binder should be stable under sterilization conditions and should be otherwise compatible with the intended sterilization method. Specific non-limiting examples of polymer binders that are suitable for sterilization methods that involve exposure to high temperatures include cellulose nitrate, polyethersulfone, nylon, polypropylene, polytetrafluoroethylene, and mixed cellulose esters. Compositions prepared with these binders can be autoclaved when the prepared according to known standards. The aggregate composition can be stable to steam sterilization or autoclaving as well as to chemical sterilization through contact with oxidative or reductive chemical species, as a combination of sterilization methods may be required for efficient and effective regeneration. In an embodiment where sterilization includes the electrochemical generation of an oxidative or reductive chemical species, the electrical potential necessary to generate said species can be attained by using the composition as one of the electrodes. For example, a composition that contains a normally insulative polymer binder can be rendered conductive through the inclusion of a sufficiently high level of conductive particles such as granular activated carbon, carbon black, or metallic particles. Alternatively, if the desired level of carbon or other particles is not sufficiently high to render an otherwise insulative polymer conductive, an intrinsically conductive polymer may included in the binder material.

Optional components that are suitable for use in the aggregate composition can include one or more of soluble rare earth-containing compounds, decontamination agents, biocidal agents, adsorbents, flow aids, non-polymer binders and substrates, and the like. Such optional components may be included in the aggregate composition depending on the intended utility and/or the desired characteristics of the composition.

Optional soluble rare earth-containing compounds can have different activities and effects. By way of example, some soluble rare earth-containing compounds have been recognized as having a bacteriostatic or antimicrobial effect. Cerium chloride, cerium nitrate, anhydrous eerie sulfate, and lanthanum chloride are described as having such activity in "The Bacteriostatic Activity of Cerium, Lanthanum, and Thallium", Burkes et al., Journal of Bateriology, 54:417-24 (1947). Similarly, the use of soluble cerium salts such as cerium nitrates, cerous acetates, cerous sulfates, cerous halides and their derivatives, and cerous oxalates are described for use in burn treatments in U.S. Pat. No. 4,088,754, such descriptions being incorporated herein by reference. Other soluble rare earth-containing compounds, whether organic or inorganic in nature, may impart other desirable properties to the compositions and may optionally be used.

Optional decontamination agents may include materials that are capable of removing or detoxifying chemical contaminants from various surfaces. Non-limiting examples of decontamination agents that may be suitable include transition metals and alkaline metals as described in U.S. Pat. No. 5,922,926, polyoxometallates as described in U.S. Patent Application Publication No. 2005/0159307 A1, aluminum oxides as described in U.S. Pat. No. 5,689,038 and U.S. Pat. No. 6,852903, quaternary ammonium complexes as described in U.S. Pat. No. 5,859,064, zeolites as described in U.S. Pat. No. 6,537,382, and enzymes as described in U.S. Pat. No. 7,067,294. The descriptions of these decontamination agents in the noted references are incorporated herein by reference.

Biocidal agents can optionally be included for targeting biological contaminants in a solution or gas. Materials that may be suitable for use as biocidal agents include but are not limited to alkali metals, alkaline earth metals, transition metals, actinides, and derivatives and mixtures thereof. Specific non-limiting examples of secondary biocidal agents include elemental or compounds of silver, zinc, copper, iron, nickel, manganese, cobalt, chromium, calcium, magnesium, strontium, barium, boron, aluminum, gallium, thallium, silicon, germanium, tin, antimony, arsenic, lead, bismuth, scandium, titanium, vanadium, yttrium, zirconium, niobium, molybdenum, technetium, ruthenium, rhodium, palladium, cadmium, indium, hafnium, tantalum, tungsten, rhenium, osmium, iridium, platinum, gold, mercury, thallium, thorium, and the like. Derivatives of such agents can include acetates, ascorbates, benzoates, carbonates, carboxylates, citrates, halides, hydroxides, gluconates, lactates, nitrates, oxides, phosphates, propionates, salicylates, silicates, sulfates, sulfadiazines, and combinations thereof. When the aggregate composition optionally comprises a titanium-containing compound such as a titanium oxide, the weight ratio of the titanium-containing compound to the insoluble rare earth-containing compound is less than about 2:1. When the aggregate composition optionally comprises an aluminum-containing compound, the weight ratio of the aluminum-containing compound to the insoluble rare earth-containing compound is less than about 10:1. When one or more of the components of the aggregate composition is to be sintered, the composition will contain no more than two elements selected from the group consisting of yttrium, scandium, and europium. In an embodiment that includes an optional biocide agent selected from the group consisting of transition metals, transition metal oxides and transition metal salts, the aggregate composition will comprise less than about 0.01% by weight of a mixture of silver and copper metal nanoparticles.

Other materials that may be suitable for use as biocidal agents include organic agents such as quaternary ammonium salts as described in U.S. Pat. No. 6,780,332, and organosilicon compounds such as are described in U.S. Pat. No. 3,865,728. Other organic materials and their derivatives that are known to deactivate biological contaminants may also be used. By way of example, polyoxometalates are described in U.S. Pat. No. 6,723,349 as being effective at removing biological contaminants from fluids. This patent references M. T. in Heteropoly and Isopoly Oxometalates, Springer Verlag, 1983, and Chemical Reviews, vol. 98, No. 1, pp. 1-389, 1998, as describing examples of effective polyoxometalates. The descriptions of these organic biocidal agents in the noted references are incorporated herein by reference.

The aggregate composition may optionally comprise one or more flow aids. Flow aids are used in part to improve the fluid dynamics of a fluid over or through the aggregate composition, to prevent separation of components of the aggregate composition, prevent the settling of fines, and in some cases to hold the aggregate composition in place. Suitable flow aids can include both organic and inorganic materials. Inorganic flow aids can include ferric sulfate, ferric chloride, ferrous sulfate, aluminum sulfate, sodium aluminate, polyaluminum chloride, aluminum trichloride, silicas, diatomaceous earth and the like. Organic flow aids can include organic flocculents known in the art such as polyacrylamides (cationic, nonionic, and anionic), EPI-DMA's (epichlorohydrin-dimethylamines), DADMAC's (polydiallydimethylammonium chlorides), dicyandiamide/formaldehyde polymers, dicyandiamide/amine polymers, natural guar, etc. When present, the flow aid can be mixed with the insoluble rare earth-containing compound and polymer binder during the formation of the aggregate composition. Alternatively, particulates of the aggregate composition and of the flow aid can be mixed to yield a physical mixture with the flow aid dispersed uniformly throughout the mixture. In yet another alternative, the flow aid can be disposed in one or more distinct layers upstream and downstream of the aggregate composition. When present, flow aids are generally used in low concentrations of less than about 20%, in some cases less than 15%, in other cases less than 10%, and in still other cases less than about 8% by weight of the aggregate composition.

Other optional components can include various inorganic agents including ion-exchange materials such as synthetic ion exchange resins, activated carbons, zeolites (synthetic or naturally occurring), minerals and clays such as bentonite, smectite, kaolin, dolomite, montmorillinite and their derivatives, metal silicate materials and minerals such as of the phosphate and oxide classes. In particular, mineral compositions containing high concentrations of calcium phosphates, aluminum silicates, iron oxides and/or manganese oxides with lower concentrations of calcium carbonates and calcium sulfates are suitable. These materials may be calcined and processed by a number of methods to yield mixtures of varying compositions.

Other optional components of the aggregate composition include additives, such as particle surface modification additives, coupling agents, plasticizers, fillers, expanding agents, fibers, antistatic agents, initiators, suspending agents, photosensitizers, lubricants, wetting agents, surfactants, pigments, dyes, UV stabilizers, and suspending agents. The amounts of these materials are selected to provide the properties desired.

The aggregate composition can be used to remove, deactivate or detoxify chemical and biological contaminants in a solution or gas by contacting the fluid with the composition. Those familiar with the art of fluid treatment will understand that the components, physical dimensions and shape of the aggregate composition may be manipulated for different applications and that variations in these variables can alter flow rates, back-pressure, and the activity of the composition for treating certain contaminants. As a result, the size, form and shape of the aggregate composition can vary considerably depending on the intended method of use. In an embodiment where the aggregate composition is used to treat an aqueous solution containing arsenic, the aggregate composition can have an adsorption capacity for removing arsenic from the solution of at least about 50 mg of arsenic per gram of the aggregate composition. In some cases the adsorption capacity will be at least about 60 mg/g and in other cases at least about 70 mg/g. The adsorption capacity is believed to be in part dependent on the surface area of the insoluble rare earth-containing compound used to prepare the aggregate composition and of the resulting the aggregate composition.

The aggregate composition can be formed though one or more of mixing, extrusion, molding, heating, calcining, sintering, pressing, compaction, the use adhesives and/or other techniques known in the art. In embodiments where it is desired that the aggregate composition have higher surface areas, sintering is less desired. The use of the polymer binder enables the production of an aggregate composition of sufficient size, structure and durability for use in the treatment of solutions and gases. The combination of the polymer binder and the insoluble rare earth-containing compound produces an aggregate composition that has elevated activity for decontaminating fluids without imposing a substantial pressure drop on the treated fluid.

The aggregate composition can comprise a flowable particulate, granule, bead, pellet, powder, fiber, or similar form. Such particulates can have a mean particle size of at least about 1 µm, specifically at least about 5 µm, more specifically at least about 10 µm, and still more specifically at least about 25 µm. In other embodiments, the aggregate will have a mean particle size of at least about 0.1 mm, specifically at least about 0.5 mm, more specifically at least about 1 mm, still more, specifically at least about 2 mm, and yet still more specifically more than 5.0 mm. The aggregate composition can be crushed, cut, chopped or milled and then sieved to obtain a desired particle size. Such flowable particulates can be used in fixed or fluidized beds or reactors, stirred reactors or tanks, distributed in particulate filters, encapsulated or enclosed within membranes, mesh, screens, filters or other fluid permeable, structures, deposited on filter substrates, and may further be formed into a desired shape such as a sheet, film, mat or monolith for various applications.

In addition, the aggregate composition can be incorporated into or coated onto a filter substrate. Filter substrates can include polymer and non-polymer binder materials as described herein and materials such as ceramics, metals, carbons, and the like. Filter substrates can be made from particulates, fibers, sheets, films and combinations of the same. The structure of a filter substrate will vary depending upon the application but can include any fluid permeable structure having a desired shape and physical dimensions suitable for the conditions of use. Non-limiting examples include mesh, screens, films, sheets, tubes, honeycombed structures, monoliths and blocks of various shapes including cylinders and toroids.

In another embodiment, the invention provides a process for making an aggregate composition for treating a fluid containing one or more contaminants. The process includes the step of mixing an insoluble rare earth-containing compound with a polymer binder to form a mixture. The insoluble rare earth-containing compound and polymer binder materials have been described in detail above. In a more specific embodiment, the insoluble rare earth-containing compound comprises a high surface area particulate of an insoluble cerium-containing compound, more particularly, the product of a calcined cerium carbonate. Specific examples of the polymer binders that may be mixed with the insoluble rare earth-containing compound include polyolefins, cellulose acetate, acrylonitrile-butadiene-styrene, PTFE, paper fibers, glass fibers or beads, and adhesive polymers. The polymer binder should be selected so as not to have a melting point that exceeds the sintering temperature of the selected insoluble rare earth-containing compound, as sintering of the insoluble rare earth-containing compound can reduce the surface area of the final aggregate composition.

Techniques and equipment known in the art for mixing particulates and fibers can be used to mix the components. The components are subjected to mixing for a period of time sufficient to yield a relatively homogeneous mixture. Moreover, to ensure a more uniform distribution of the insoluble rare earth-containing compound throughout the aggregate composition, in embodiments where the mixture is to be subjected to a heat treatment, it is preferred that the components be thoroughly mixed prior to heating.

The mixture is subjected to one or more of a mechanical, chemical and thermal treatment to adhere the insoluble rare earth-containing compound to the polymer binder. Mechanical treatments can include compacting, compressing, pressing, mixing, extruding and subjecting the mixture to vibration or waves. Compression of the mixture can occur prior, during or after the mixture is heated depending on the desired properties of the aggregate composition. The mixture can be compressed in a press, test cylinder, extruder or other equipment known in the art for compressing or compacting materials into a desired shape or form. The amount of pressure and the duration that such pressure is applied will depend on the selected components, their binding characteristics and the intended use of the aggregate composition. Within limits, the application of higher pressures and/or the application of pressure for longer periods of time are intended to prevent the aggregate composition from degrading or producing fines under conditions of use. Chemical treatments can include one or more of chemical conversion and use of chemical adhesive(s) such as are known in the art. By way of example, a cross linker may be used to promote cross linking of the polymer binder. Thermal treatments can include heating the mixture to an elevated temperature to promote a chemical and/or physical conversion.

In one embodiment, the mixture is heated to a temperature below the melting point of the polymer binder at which the polymer binder softens and becomes malleable or tacky to the touch. The mixture should be heated to a temperature sufficient to ensure that the insoluble rare earth-containing compound will adhere to the polymer binder without fully melting the polymer binder. The specific temperature will depend on the composition of the selected polymer binder. The mixture is then allowed to cool to form an aggregate composition.

In some embodiments, the polymer binder comprises one or more of fibers, particulates, aggregates of fibers or particulates, and mixtures of the same, and the insoluble rare earth-containing compound is adhered to the outer surface of the polymer binder upon treatment of the mixture. Where the insoluble rare earth-containing compound is in the form of a particulate, the aggregate composition product can comprise a matrix of insoluble rare earth-containing particulates adhered to or embedded in the outer surface of the polymer binder.

An optional step can include reducing the size of the aggregate composition. Size reduction can be achieved by techniques known in the art, including one or more of cutting, crushing, milling, and sieving the aggregate composition down to the desired size.

The following examples are provided to demonstrate particular embodiments of the present invention. It should be appreciated by those of skill in the art that the methods disclosed in the examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

Example 1

Particulate Polymer Binder

In this example, aggregates were prepared with Microthene® F (FN50100), a low density polyethylene obtained from Equistar. Microthene® F is an ultra-fine and spherical shaped powder with an average 20 micron particle size, a melt index of 23 g/10 min, and a melting range of 92.0° C.-114.5° C. The cerium oxide ($CeO_2$) was obtained from HEFA Rare Earth Canada Company, Ltd.

Physical mixtures were made of the cerium oxide and the polymer in differing compositions (by weight). Each component was weighed and mixed with a laboratory mixer fitted with a paddle attachment set to rotate at ≈160 rpm for approximately 30 minutes to achieve a homogeneous mixture. A Carver test cylinder with an internal diameter of 1.125 inches was heated to temperatures varying from 90° C. to 100° C. Four grams of the ceria/polymer mixture were poured in to the warmed die and pressed to pressures ranging from 3400 psig to 10000 psig. Pressing times varied from 5 to 20 minutes. After the pellets were pressed, they were cut and sieved between an 18×70 mesh to obtain particles on the order of 500 μm. Specific surface areas were measured on a Micromeritics FlowsorbII 2300 single point BET instrument using the manufacturer's prescribed method.

Table 1 details the parameter set.

TABLE 1

| Temperature (° C.) | Pressure (psig) | Time (min) | % Binder | SSA ($m^2/g$) |
| --- | --- | --- | --- | --- |
| 90 | 3400 | 5 | 2.5 | 107.74 |
| 90 | 10000 | 20 | 2.5 | 88.11 |
| 90 | 3400 | 20 | 10 | 79.01 |
| 95 | 6800 | 12.5 | 6.25 | 107.08 |
| 100 | 3400 | 5 | 10 | . |
| 100 | 10000 | 5 | 2.5 | 102.45 |
| 100 | 3400 | 20 | 2.5 | 92.72 |
| 100 | 10000 | 20 | 10 | 38.67 |

Example 2

Particulate Polymer Binder

In this example set, aggregates were formed with Polifil® RP ABS (acrylonitrile butadiene styrene) terpolymer obtained from The Plastics Group of America. The thermoplastic resin has a melt flow of 4-8 g/10 min and a vicat softening point of 98.9° C.

The ABS was sieved to yield particles that were less than 100 microns, then mixed with cerium oxides, pressed, and sieved following the same procedure from Example 1. The temperature range of the test cylinder was increased to 105° C. to 110° C. All other parameters remained the same. The 4 g pellets were then cut and sieved between an 18×70 mesh to yield an average particle size of 500 μm. Specific Surface Areas were determined as in Example 1.

Arsenic capacity was determined by challenging 10 mg of the prepared aggregate against 500 ml of a 400 ppb arsenic solution. The solution was prepared in NSF water and the pH was adjusted to 7.5. The 500 ml of solution and 10 mg of material were both put in a wide mouth plastic bottle and allowed to tumble for 24 hours. After the 24 hours, the aggregate was filtered and analyzed for arsenic concentration using Agilent's ICP-MS (Inductively coupled plasma mass spectrometer) Model number 7500CE. For each composition, three samples were prepared, tested and analyzed. The reported As Capacity data represents an average of the three samples for each composition.

Table 2 details the parameter set.

TABLE 2

| Temperature (° C.) | Pressure (psig) | Time (min) | % Binder | SSA ($m^2/g$) | As(V) Capacity (mg As/g material) |
| --- | --- | --- | --- | --- | --- |
| 105 | 10000 | 5 | 10 | 91.68 | 1.33 |
| 107.5 | 6800 | 12.5 | 6.25 | 87.46 | 1.28 |
| 105 | 3400 | 5 | 2.5 | 115.54 | 4.38 |
| 105 | 10000 | 20 | 2.5 | 112.27 | |
| 110 | 3400 | 5 | 10 | 88.4 | 3.41 |
| 105 | 3400 | 20 | 10 | 114.86 | 2.95 |
| 110 | 10000 | 5 | 2.5 | 78.42 | 2.15 |
| 110 | 3400 | 20 | 2.5 | 89.48 | 4.11 |
| 110 | 10000 | 20 | 10 | 115.41 | 3.24 |

Example 3

Particulate Polymer Binder with Diatomaceous Earth

In this example, the parameter set from Example 2 was altered only with the addition of diatomaceous earth (DE). The composition of the DE ranged between 1% and 5% (by weight) and all other parameters and procedures remained the same. The 4 g pellets were then cut and sieved between an 18×70 mesh to yield an average particle size of 500 μm. Specific Surface Areas were determined as in the previous Examples.

Table 3 details the parameter set.

TABLE 3

| Temperature ° C. | Pressure (psig) | % Binder | % DE | SSA ($m^2/g$) |
| --- | --- | --- | --- | --- |
| 110 | 3400 | 2.5 | 5 | 91 |
| 105 | 10000 | 2.5 | 5 | 75 |
| 105 | 3400 | 2.5 | 1 | 71 |
| 107.5 | 6800 | 6.25 | 3 | 72 |
| 110 | 3400 | 10 | 1 | 88 |
| 110 | 10000 | 2.5 | 1 | 73 |
| 105 | 10000 | 10 | 1 | 83 |
| 110 | 10000 | 10 | 5 | 64 |
| 105 | 3400 | 10 | 5 | 70 |
| 107.5 | 6800 | 6.25 | 3 | 83 |

Example 4

The procedure from the Examples 1-3 was repeated with the cerium oxide and OUR® 2122, an ultra high molecular weight polyethylene obtained from Ticona. The linear polyolefin has a molecular weight of 4.5 MM g/mol, a vicat softening point of 80° C., and particle size on the order of 100 μm.

The temperature of the test cylinder was varied between 60° C. and 100° C., the pressing pressure between 3400 psig and 10,000 psig, and the pressing time between 0.5 to 5 minutes. The 4 g pellets were cut and sieved between an 18×70 mesh to yield an average particle size of 500 μm. Specific Surface Areas were determined as in the previous Examples.

Table 4 lists the parameter matrix for this particular example.

TABLE 4

| Temperature (° C.) | Pressure (psig) | Time (min) | % Binder | SSA ($m^2/g$) |
| --- | --- | --- | --- | --- |
| 80 | 6800 | 2.75 | 6 | 82.13 |
| 100 | 10000 | 5 | 10 | 84.02 |

TABLE 4-continued

| Temperature (° C.) | Pressure (psig) | Time (min) | % Binder | SSA (m²/g) |
|---|---|---|---|---|
| 60 | 10000 | 0.5 | 10 | |
| 60 | 3400 | 0.5 | 2 | |
| 100 | 3400 | 5 | 2 | 118.01 |
| 100 | 3400 | 0.5 | 10 | 87.28 |
| 80 | 6800 | 2.75 | 6 | 90.26 |
| 60 | 3400 | 5 | 10 | |
| 60 | 10000 | 5 | 2 | |
| 100 | 10000 | 0.5 | 2 | |

Example 5

Fibrous Polymer Binder

In this example, aggregates were produced using Short Stuff® Polyethylene pulp obtained from Mini Fibers, Inc. These fibers are a high density fibrillated polyethylene, a thermoplastic with a melting range of 125° C.-136° C., a length of 0.1 mm-0.6 mm and a diameter of 5 μm. The cerium oxide is the same as with the previous examples.

Each component was weighed and mixed with a laboratory mixer fitted with a blade attachment set to rotate at =160 rpm for approximately 30 minutes to achieve a homogeneous mixture. The Carver test cylinder with an internal diameter of 1.125 inches was heated to temperatures varying from 70° C. to 115° C. Four grams of the ceria/polymer mixture were poured in to the warmed die and pressed to pressures ranging from 3400 psig to 10,000 psig. Pressing times also varied at this point from 30 to 120 seconds. The 4 g pellets were cut and sieved between an 18×35 mesh to yield minimum particle size of 500 μm. Specific Surface Areas and As Capacity were determined as in Example 2.

Table 5 details the parameter set.

TABLE 5

| Temperature (° C.) | Pressure (psig) | Time (sec) | % Binder | SSA (m²/g) | As(III) Capacity (mg As/g material) | As(V) Capacity (mg As/g material) |
|---|---|---|---|---|---|---|
| 115 | 10000 | 120 | 7 | 81.8 | 6.22 | 1.26 |
| 115 | 3400 | 120 | 2 | 105.86 | 7.51 | 3.13 |
| 92.5 | 6800 | 75 | 4.5 | 74.91 | 5.72 | 1.62 |
| 70 | 10000 | 120 | 2 | 93.17 | 5.21 | 1.77 |
| 70 | 3400 | 120 | 7 | 90.19 | 7.41 | 2.07 |
| 115 | 10000 | 30 | 2 | 105.86 | 5.88 | 1.05 |
| 115 | 3400 | 30 | 7 | 144.81 | 5.43 | 1.07 |
| 70 | 10000 | 30 | 7 | 82.77 | 5.2 | 2.16 |
| 70 | 3400 | 30 | 2 | 102.85 | 5.72 | 2.82 |
| 92.5 | 6800 | 75 | 4.5 | 84.59 | 7.02 | 3.39 |

Example 6

Fibrous Polymer Binder with Diatomaceous Earth

The aggregates in this example were prepared with the same material and procedure as in Example 5 with the addition of diatomaceous earth (DE). The composition of the DE ranged between 1% and 5% (by weight), the composition of the binder ranged from 2%-5% (by weight), and the temperature of the Carver test cylinder ranged from 70° C. to 115° C. The pressing pressure and time was held constant at 6800 psig for 1 minute. The 4 g pellets were cut and sieved between an 18×35 mesh to yield minimum particle size of 500 μm. Specific Surface Areas and As Capacity were determined as in Example 2.

Table 6 details the parameter set.

TABLE 6

| Temperature (° C.) | % Binder | % DE | SSA (m²/g) | As(III) Capacity (mg As/g material) | As(V) Capacity (mg As/g material) |
|---|---|---|---|---|---|
| 70 | 5 | 5 | 61.2 | 5.41 | 4.22 |
| 115 | 5 | 1 | 80.85 | 5.39 | 3.58 |
| 115 | 2 | 5 | 89.81 | 6.20 | 3.94 |
| 92.5 | 3.5 | 3 | 91.61 | 7.54 | 3.73 |
| 70 | 5 | 1 | 101.64 | 5.53 | 4.11 |
| 115 | 2 | 1 | 94.62 | 5.66 | 3.28 |
| 70 | 2 | 1 | 83.76 | 7.23 | 3.59 |
| 70 | 2 | 5 | 100.72 | 7.86 | 2.98 |
| 92.5 | 3.5 | 3 | 65.11 | 5.81 | 3.49 |
| 115 | 5 | 5 | 58.32 | 7.56 | 3.08 |

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A filter substrate for removing contaminants, comprising:
   an aggregate composition having an insoluble rare earth-containing compound comprising cerium (IV) oxide ($CeO_2$) adhered to a polymeric binder to form the filter substrate having a fluid permeable block structure, wherein the aggregate composition comprises more than about 11% by weight of the insoluble rare earth-containing compound.

2. The filter substrate of claim 1, wherein the polymeric binder comprises one or more polymers selected from the group consisting of thermosetting polymers, thermoplastic polymers, elastomeric polymers, cellulosic polymers, and glasses.

3. The filter substrate of claim 1, wherein the insoluble rare earth-containing compound comprises particulates having a mean surface area of at least about 5 m²/g.

4. The device of claim 1, wherein the insoluble rare earth-containing compound comprises particulates having a mean particle size of greater than about 1 nm.

5. The filter substrate of claim 1, wherein the insoluble rare earth-containing compound comprises two or more insoluble rare earth-containing compounds.

6. The filter substrate of claim 5, wherein the insoluble rare earth-containing compounds have one or both of differing valence and oxidation states.

7. The filter substrate of claim 1, wherein the polymeric binder comprises one or more of fibers, particulates, fiber aggregates and particulate aggregates.

8. The filter substrate of claim 1, wherein the insoluble rare-earth containing compound interacts with a contaminant in a solution or gas.

9. The filter substrate of claim 8, wherein the contaminate is a chemical contaminate.

10. The filter substrate of claim 8, wherein the contaminate is a biological contaminate.

11. The filter substrate of claim 8, wherein the solution or gas flows through the aggregate composition.

12. The filter substrate of claim 1, wherein the polymeric binder comprises one or more of polyurethanes, silicones, fluorosilicones, phenolic resins, melamine resins, melamine formaldehyde, and urea formaldehyde, nylons and other polyamides, polyethylenes, including LDPE, LLDPE, HDPE, polyethylene copolymers with other polyolefins, polyvinylchlorides (both plasticized and unplasticized), fluorocarbon resins, such as polytetrafluoroethylene, polystyrenes, polypropylenes, cellulosic resins such as cellulose acetate butyrates, acrylic resins, such as polyacrylates and polymethylmethacrylates, thermoplastic blends or grafts such as acrylonitrile-butadiene-styrenes or acrylonitrile-styrenes, polycarbonates, polyvinylacetates, ethylene vinyl acetates, polyvinyl alcohols, polyoxymethylene, polyformaldehyde, polyacetals, polyesters, such as polyethylene terephthalate, polyether ether ketone, and phenol-formaldehyde resins, such as resols and novolacs, natural and/or synthetic rubbers, like styrene-butadiene rubbers, neoprenes, nitrile rubber, butyl rubber, silicones, polyurethanes, alkylated chlorosulfonated polyethylene, polyolefins, chlorosulfonated polyethylenes, perfluoroelastomers, polychloroprene (neoprene), ethylene-propylene-diene terpolymers, chlorinated polyethylene, fluoroelastomers, and ZALAK™ (Dupont-Dow elastomer).

13. A filter substrate for removing contaminants, comprising:
cerium (IV) oxide ($CeO_2$); and
a polymeric binder adhered to the cerium (IV) oxide to form a fluid permeable block structure configured to pass a contaminated fluid to be purified by the cerium (IV).

14. The filter substrate of claim 13, wherein the polymeric binder comprises one or more polymers selected from the group consisting of thermosetting polymers, thermoplastic polymers, elastomeric polymers, cellulosic polymers, and glasses.

15. The filter substrate of claim 13, wherein the cerium (IV) oxide is in the form of particulates having a mean surface area of at least about 5 $m^2/g$ and wherein the aggregate composition comprises more than about 11% by weight of the cerium (IV) oxide.

16. The device of claim 13, wherein the insoluble rare earth-containing compound comprises particulates having a mean particle size of greater than about 1 nm.

17. The filter substrate of claim 13, wherein the polymeric binder comprises one or more of fibers, particulates, fiber aggregates and particulate aggregates.

18. The filter substrate of claim 13, wherein the polymeric binder comprises one or more of polyurethanes, silicones, fluorosilicones, phenolic resins, melamine resins, melamine formaldehyde, and urea formaldehyde, nylons and other polyamides, polyethylenes, including LDPE, LLDPE, HDPE, polyethylene copolymers with other polyolefins, polyvinylchlorides (both plasticized and unplasticized), fluorocarbon resins, such as polytetrafluoroethylene, polystyrenes, polypropylenes, cellulosic resins such as cellulose acetate butyrates, acrylic resins, such as polyacrylates and polymethylmethacrylates, thermoplastic blends or grafts such as acrylonitrile-butadiene-styrenes or acrylonitrile-styrenes, polycarbonates, polyvinylacetates, ethylene vinyl acetates, polyvinyl alcohols, polyoxymethylene, polyformaldehyde, polyacetals, polyesters, such as polyethylene terephthalate, polyether ether ketone, and phenol-formaldehyde resins, such as resols and novolacs, natural and/or synthetic rubbers, like styrene-butadiene rubbers, neoprenes, nitrile rubber, butyl rubber, silicones, polyurethanes, alkylated chlorosulfonated polyethylene, polyolefins, chlorosulfonated polyethylenes, perfluoroelastomers, polychloroprene (neoprene), ethylene-propylene-diene terpolymers, chlorinated polyethylene, fluoroelastomers, and ZALAK™ (Dupont-Dow elastomer).

19. A filter substrate for removing contaminants, comprising:
cerium (IV) oxide ($CeO_2$); and
a polymeric binder adhered to the cerium (IV) oxide to form a fluid permeable block structure configured to pass a contaminated fluid to be purified by the cerium (IV), wherein the aggregate composition comprises more than about 11% by weight of the cerium (IV) oxide and wherein the polymeric binder comprises one or more of polyurethanes, silicones, fluorosilicones, phenolic resins, melamine resins, melamine formaldehyde, and urea formaldehyde, nylons and other polyamides, polyethylenes, including LDPE, LLDPE, HDPE, polyethylene copolymers with other polyolefins, polyvinylchlorides (both plasticized and unplasticized), fluorocarbon resins, such as polytetrafluoroethylene, polystyrenes, polypropylenes, cellulosic resins such as cellulose acetate butyrates, acrylic resins, such as polyacrylates and polymethylmethacrylates, thermoplastic blends or grafts such as acrylonitrile-butadiene-styrenes or acrylonitrile-styrenes, polycarbonates, polyvinylacetates, ethylene vinyl acetates, polyvinyl alcohols, polyoxymethylene, polyformaldehyde, polyacetals, polyesters, such as polyethylene terephthalate, polyether ether ketone, and phenol-formaldehyde resins, such as resols and novolacs, natural and/or synthetic rubbers, like styrene-butadiene rubbers, neoprenes, nitrile rubber, butyl rubber, silicones, polyurethanes, alkylated chlorosulfonated polyethylene, polyolefins, chlorosulfonated polyethylenes, perfluoroelastomers, polychloroprene (neoprene), ethylene-propylene-diene terpolymers, chlorinated polyethylene, fluoroelastomers, and ZALAK™ (Dupont-Dow elastomer).

\* \* \* \* \*